June 15, 1943.     J. M. COLBY     2,321,579
COMBINATION HEATER AND GENERATING UNIT FOR ARMORED VEHICLES
Filed June 27, 1942     3 Sheets-Sheet 1
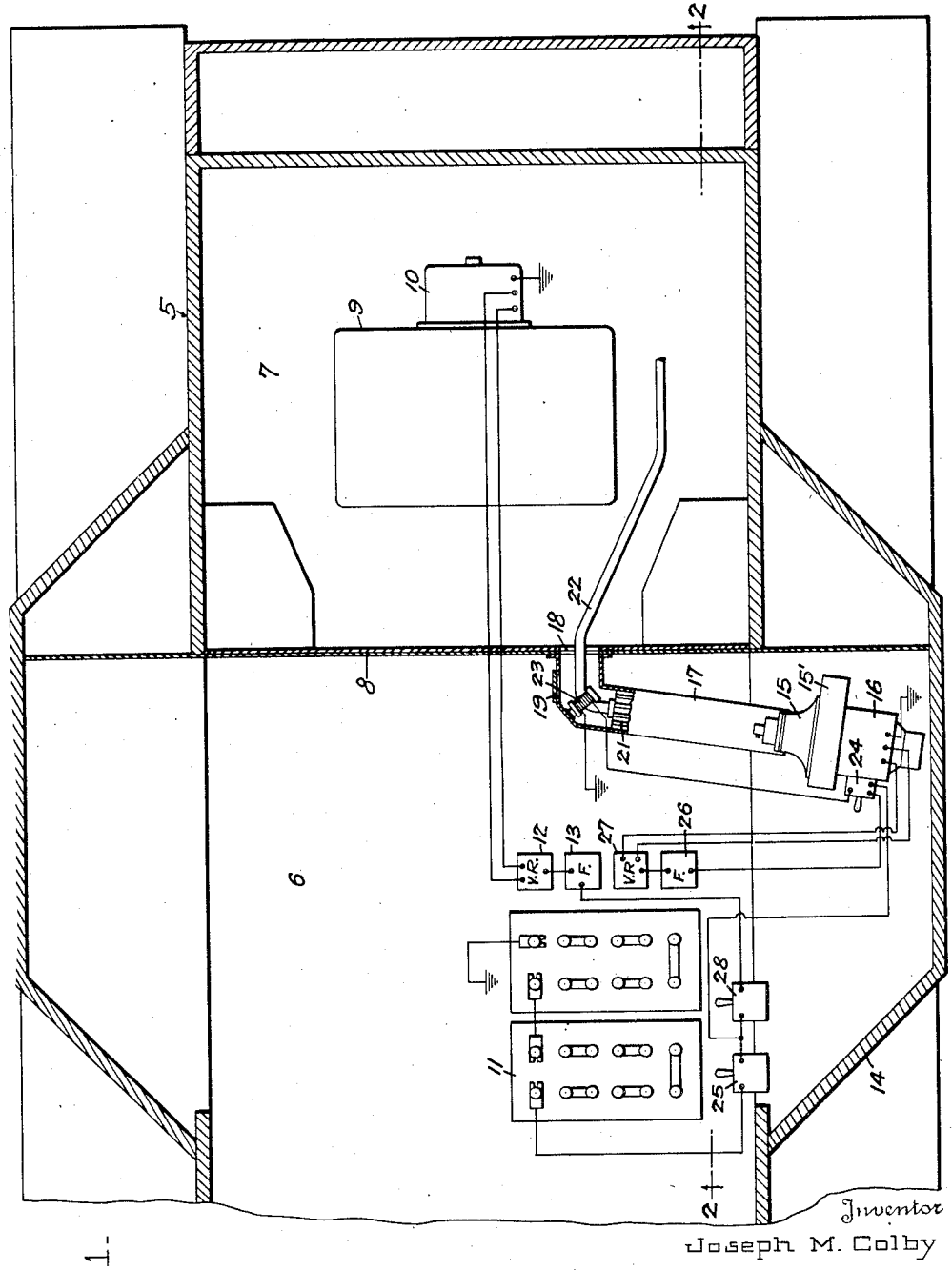
Inventor
Joseph M. Colby June 15, 1943. J. M. COLBY 2,321,579
COMBINATION HEATER AND GENERATING UNIT FOR ARMORED VEHICLES
Filed June 27, 1942 3 Sheets-Sheet 2
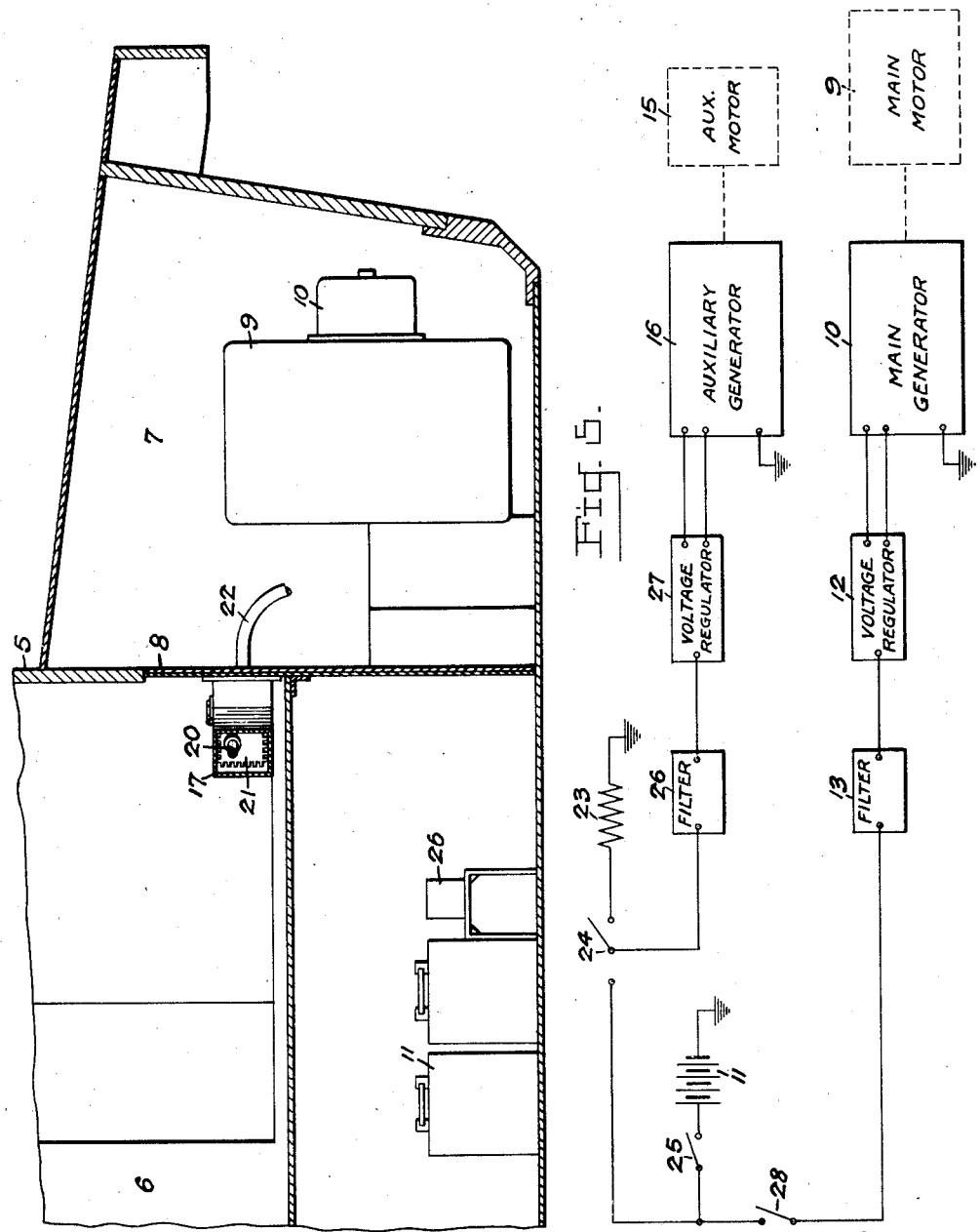
Inventor
Joseph M. Colby
By G. J. Kessenich & D. H. Church
Attorneys

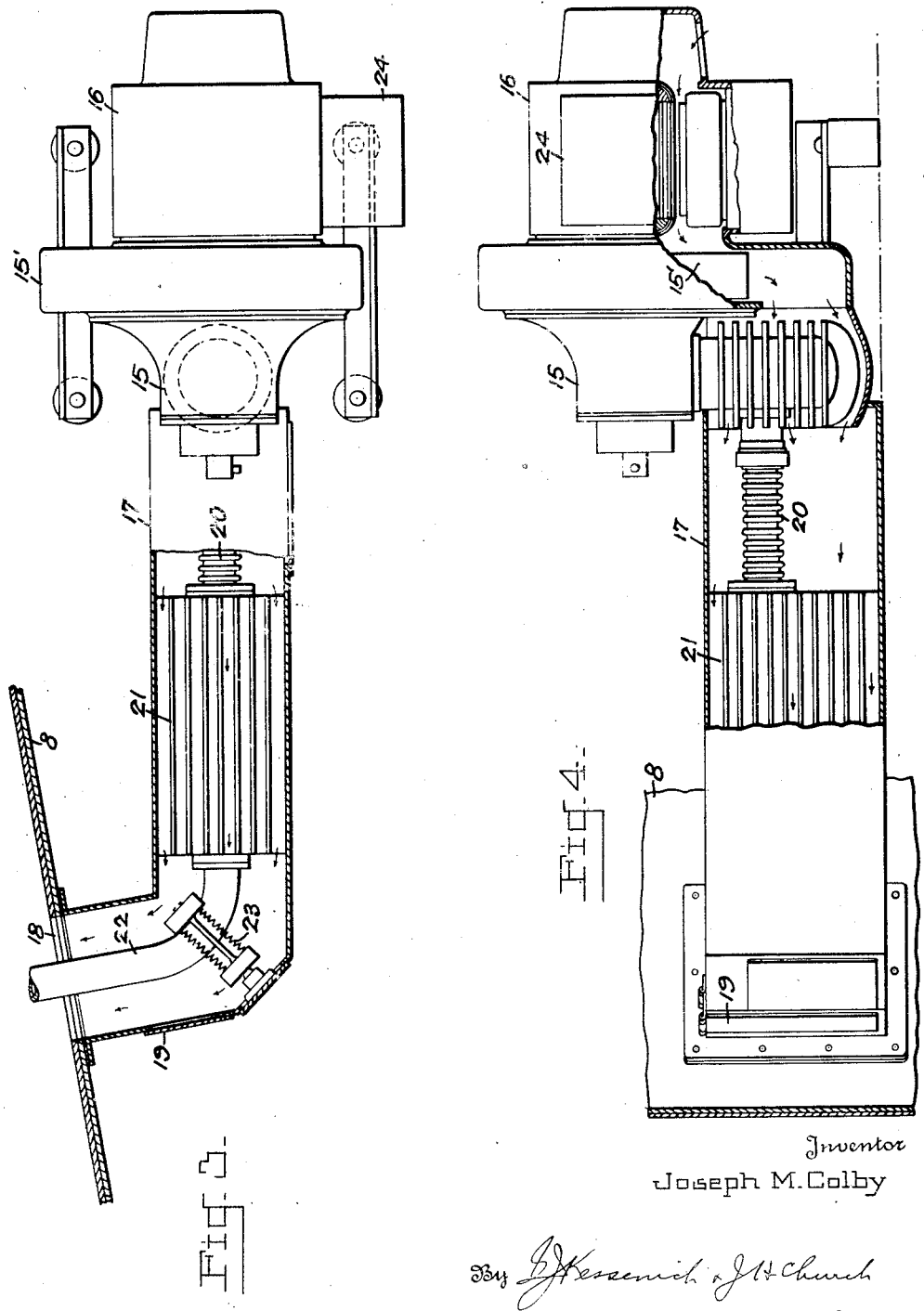

Patented June 15, 1943

2,321,579

UNITED STATES PATENT OFFICE 2,321,579

COMBINATION HEATER AND GENERATING UNIT FOR ARMORED VEHICLES

Joseph M. Colby, United States Army, Lake Mills, Iowa

Application June 27, 1942, Serial No. 448,826

8 Claims. (Cl. 219—39)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a combination auxiliary heater unit and battery charger for an automotive device such as an armored vehicle.

Modern warfare is characterized by its speed and suddenness of attack which is designed to give the aggressor as immediate and often overwhelming advantage. Mechanized vehicles constitute a vital factor in this type of action. Since military operations often extend from the tropics to the northern latitudes, the equipment employed must be adapted for combat under a wide variety of climatic conditions.

To preserve the element of surprise, immediate starting of armored vehicles is often imperative even in extremely cold weather. This quick starting places a severe load on the electrical power plant of such a vehicle. Since batteries form the initial source of electrical energy for the ignition and control systems of these devices, it is essential that these reservoirs of energy be maintained in a fully charged condition at all times.

An object of the invention is to provide an extremely quiet, efficient unit for heating the driving motor of an armored device preparatory to starting the motor.

Another object of the invention is to provide an armored device with a heating unit having a source of energy independent of the main electrical power plant of the device.

Another object of this invention is to provide auxiliary generating equipment which is selectively operable to charge the batteries of an armored vehicle independently of the main power plant or in conjunction therewith.

A further object of the invention is to provide a substantially noiseless unit for heating the fighting compartment and the engine compartment of an armored device.

The specific nature of the invention as well as other objects and advantages thereof will clearly appear from a description of a preferred embodiment as shown in the accompanying drawings in which:

Fig. 1 is a diagrammatic plan view partly in section of a portion of the inside of an automotive device such as a tank showing the arrangement of the combined heater and generating unit, Fig. 2 is a vertical sectional view on the line 2—2 of Fig. 1, Fig. 3 is an enlarged plan view with parts in section of the auxiliary motor-generator unit and the duct heater organization, Fig. 4 is a view in side elevation and partly in section of the arrangement shown in Fig. 3, and Fig. 5 is a schematic wiring diagram of the generator and battery circuits with the driving motors shown in phantom.

Referring to Figs. 1 and 2, an armored device such as a tank 5 is provided with a fighting compartment 6 and an adjoining engine compartment 7. A bulkhead 8 separates the two compartments and is provided with a door (not shown) for getting from one chamber to another. An air cooled gasoline motor 9 constitutes the power plant for propelling the vehicle and is equipped with an electrical generator 10 coupled to the engine crankshaft. This generator is the main generator for the tank and is connected in parallel with a battery 11 through suitable switches and other electrical devices as shown schematically in Fig. 5. Battery 11 is located under the fighting compartment 6 and is connected to the ignition system of the tank (not shown) in a manner well understood in the automotive art. This battery is principally used for starting purposes but also may be employed for furnishing energy for controlling the guns and other devices when the tank engine 9 is not running.

The main generator 10 in conjunction with a conventional voltage regulator 12 and a filter 13 (see Fig. 5) function like similar equipment in any automotive circuit. When the propelling motor 9 is operating at a sufficient speed, the generator supplies the electrical energy for all electrical circuits and pumps current into the battery. Voltage regulator 12 may be one of the common types which regulates both current and voltage.

Mounted in one of the sponsons 14 of the tank is a motor-generator set. This comprises a small gasoline driven motor 15 coupled to an auxiliary electrical generator 16. In accordance with a practical embodiment, the motor 15 is a single cylinder machine and is preferably coupled to a small impeller type fan or blower 15' which draws air from the fighting compartment 6 through the generator frame, around the motor 15 and directs it into a fabricated duct 17 arranged as shown in Figs. 1, 3 and 4. This duct leads from the vicinity of the blower to an opening 18 in the bulkhead and discharges into the engine compartment 7. A small door 19 is provided on the duct and when opened functions as an outlet for air from the duct into the fighting compartment. The exhaust connections of the motor 15 are led into the duct by a flexible connection 20 which is coupled to an exhaust heater 21. From the other end of the heater an exhaust pipe 22 passes into the engine compartment to a muffler (not shown) and out of the tank at a convenient location. It is to be noted that exhaust gases are not discharged into the duct or fighting compartment but simply lose a substantial amount of heat to the exhaust heater 21. This heat is radiated in the duct 17 where it raises the temperature of the air therein.

An electric heater 23 is mounted in the duct between the exhaust heater 21 and the door 19. This heater is connected to the auxiliary generator 16 through suitable control devices as shown schematically in Fig. 5. One pole of a reversing switch 24 is connected to the ungrounded side of the heater 23 and another is coupled to a line switch 25 which is connected to the battery. The central pole of the reversing switch is connected to the auxiliary generator 16 through a filter 26 and a voltage regulator 27. A switch 28 is employed in the main generator circuit between the filter 13 and the main line switch 25 for a purpose which will be mentioned later.

Very often tank units must remain concealed while awaiting the signal for attack. It is obligatory that silence be maintained during this period to preserve the advantage of the element of surprise. It is also necessary that the propelling motor 9 of each tank be warm and ready for instant movement regardless of the intensity of the cold. This is effectively accomplished by operating the auxiliary motor-generator set so as to energize the duct heater 23. At this time the propelling motor 9 is not running so that the usual loud roar from its operation does not exit. Since the small gasoline motor 15 of the auxiliary motor-generator set is provided with an effective noise suppressing muffler, no sounds which would give a warning emanate from the tank. When the reversing switch 24 is thrown to the right (Fig. 5), the duct heater 23 is connected to the auxiliary generator 16. Heat radiates from the exhaust heater 21 and the electrical grid 23 and fills the duct 17. When door 19 is closed as shown in Fig. 1, the heat is forced into the engine compartment 7 of the tank by the blower 15' in the motor-generator set. It has been possible to heat the air in the duct in excess of 200° F. before discharging it into the engine compartment. This hot air elevates the temperature of the cold motor 9 to such a degree that when the signal to advance is given, the propelling motor 9 will turn over and start readily. It will be seen that this materially reduces the load which is drawn from the battery 11 for starting purposes.

When switch 24 is thrown to the left (Fig. 5), the auxiliary generator is connected in parallel with the battery and the main generator 10. When operating in this arrangement, it is possible to charge the battery as well as to supply energy to the electrical devices in the tank. The voltage regulators 12 and 27 control the fields of the two generators so as to cause them to divide any electrical load on the line evenly between them.

If the main generator 10 fails to function, the auxiliary generator 16 can be made to carry the running load independently of the main generator by opening switch 28, thus isolating the last named generator. This adds a feature of flexibility and insures a device for maintaining the battery in a fully charged condition.

Door 19 provides access to the duct 17 and also may be employed, when opened, to by-pass some of the heated air into the fighting compartment to provide warmth for the fighting personnel.

It is evident from the above description that the auxiliary motor generator set is adapted to selectively heat the engine compartment and supplement or replace the main generator in charging the battery and in supplying electrical energy for the electrical circuits of the vehicle.

I claim:

1. A heating unit for the main engine compartment of an automotive device comprising, a motor-generator set positioned outside of said compartment, a fan coupled to said set, a duct connecting said fan and said engine compartment, an electrical heater in said duct, and electrical connections between the generator and the heater.

2. In a heating unit for the main engine compartment of an automotive device, a motor-generator set positioned outside the compartment, the motor comprising an internal combustion engine with an exhaust connection, a fan operatively coupled to the set, a duct interconnecting the fan and the engine compartment, an exhaust heater in the duct coupled to the exhaust connection of the motor, an electrical heater in the duct, and electrical connections between the generator and the heater.

3. A heating unit for an automotive device having an engine compartment and a fighting compartment, a motor-generator set positioned in the fighting compartment, a fan operatively coupled to the motor-generator set, a duct interconnecting the fan and the engine compartment, said duct having an air intake in the fighting comparting and an outlet into the engine compartment, an electrical heater in the duct having electrical connections with the generator, and a door in the duct beyond the heater for optional discharge of heated air into the fighting compartment.

4. A heating unit for an automotive device having an engine compartment and a fighting compartment, a motor-generator set positioned in the fighting compartment, the motor comprising an internal combustion engine with an exhaust connection, a fan operatively coupled to the motor-generator set, a duct interconnecting the fan and the engine compartment, said duct having an air intake in the fighting compartment and an outlet into the engine compartment, an exhaust heater in the duct coupled to the exhaust connection of the motor, an electrical heater in the duct having electrical connections with the generator, and a door in the duct beyond the heaters for the optional discharge of heated air into the fighting compartment.

5. In a heating unit for the engine compartment of an automotive device having a main power plant and primary source of electrical energy, an internal combustion engine and an electrical generator mounted outside of the compartment and independent of the main power plant and the primary source of electrical energy, said engine and generator having a driving connection therebetween, a duct having an air intake through the generator frame and an outlet into the engine compartment, an electrical heater in the duct, and electrical connections between the generator and the heater.

6. In a heating unit for the engine compartment of an automotive device having a main power plant and a primary source of electrical energy, an internal combustion engine and an electrical generator mounted outside of the compartment and independent of the main power plant and the primary source of electrical energy, said engine having an exhaust connection, a driving connection between the engine and the generator, a duct interconnecting the motor and the engine compartment, said duct having an air intake passage through the generator frame and around the motor and an outlet into the engine compartment, a fan operatively connected to the motor and in communication with the duct, an exhaust heater in the duct coupled to the exhaust connection of the motor, an electrical heater in the duct, and an electrical circuit between the generator and the heater.

7. In combination with the main generator and battery of an automotive device, an auxiliary motor generator set mechanically independent of the main generator, electrical circuits operatively connecting said auxiliary generator in parallel with the battery and the main generator, an electric heater having an electrical circuit arranged for selective energization by the auxiliary generator, and switch means in said circuits whereby said generators are selectively controlled for parallel operation or for isolation providing independent operation with the battery, said switch means also adapted to interconnect the auxiliary generator with the heater independently of the battery and the main generator.

8. In combination with the main generator and battery of an automotive device, an auxiliary motor generator set mechanically independent of the main generator, electrical circuits operatively connecting said auxiliary generator in parallel with the battery and the main generator, an electric heater having an electrical circuit arranged for selective energization by the auxiliary generator, switch means in said circuits whereby said generators are selectively controlled for parallel operation or for isolation providing independent operation with the battery, said switch means also adapted to interconnect the auxiliary generator with the heater independently of the battery and the main generator, and regulating means in said generator circuits whereby the generators divide the load evenly during parallel operation.

JOSEPH M. COLBY.